United States Patent [19]

Clutter et al.

[11] Patent Number: 4,483,058

[45] Date of Patent: Nov. 20, 1984

[54] IMPACT HAMMER ELBOW TOOL

[75] Inventors: Melvin E. Clutter; Lewis A. Shaw, both of Centralia, Mo.

[73] Assignee: A. B. Chance Company, Centralia, Mo.

[21] Appl. No.: 471,868

[22] Filed: Mar. 3, 1983

[51] Int. Cl.³ .............................................. B23P 19/04
[52] U.S. Cl. ..................................................... 29/254
[58] Field of Search .......................... 29/254, 255, 275; 81/463; 30/277

[56] References Cited

U.S. PATENT DOCUMENTS

| | | | |
|---|---|---|---|
| 1,893,414 | 1/1933 | Johnson et al. | 29/275 |
| 2,380,068 | 7/1945 | Patton | 29/255 |
| 2,572,370 | 10/1951 | Moeller | 29/275 |
| 3,739,452 | 6/1973 | Gadberry | 29/254 |
| 4,101,088 | 7/1978 | Stauth | 30/277 |

Primary Examiner—Robert C. Watson
Attorney, Agent, or Firm—Schmidt, Johnson, Hovey & Williams

[57] ABSTRACT

A simplified, impulse-type pulling and installing tool for appliances such as electrical connector elbows is provided which in use generates a sharp impact force to facilitate quick, safe elbow manipulation even under electrical load, thereby reducing the probability of flashover. In preferred forms, the tool includes an elongated rod having workpiece-engaging apparatus adjacent one end thereof, with tubular hammer means telescoped over the rod and reciprocably slidable along a portion of the length thereof. The hammer includes structure defining a pair of hammering surfaces respectively located adjacent the opposed ends of the hammer, and the rod is moreover provided with anvil means secured thereto and oriented for engagement by the hammering surfaces when the hammer is slid along the rod. A pair of such hammering surfaces are provided, which are cooperatively oriented relative to the hammering means, so that fore and aft impact forces can be developed along the length of the rod as desired. In particularly preferred forms, the anvil means is secured to the rod within the bore of the hammer means, and presents a pair of opposed anvil surfaces respectively engageable by corresponding, internal hammering surfaces on the hammering means.

3 Claims, 7 Drawing Figures

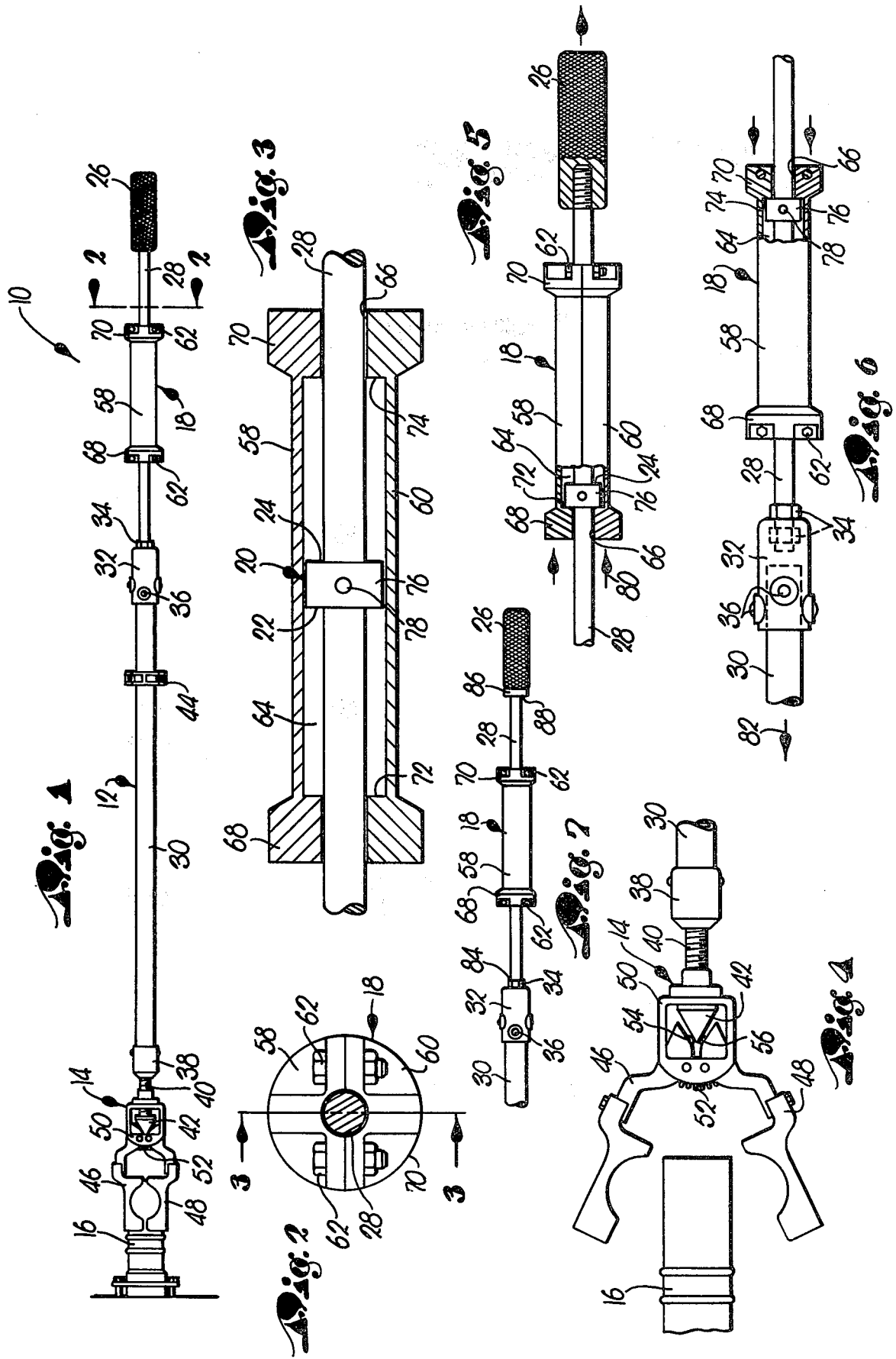

IMPACT HAMMER ELBOW TOOL

BACKGROUND OF THE INVENTION

1. Field of the Invention

The present invention is broadly concerned with an improved tool designed for workpiece manipulation and which includes as a part thereof structure for imparting sharp, impulse-type loads to the tool so as to facilitate operation thereof. More particularly, it is concerned with such a tool which, in preferred forms, is designed for installation or removal of electrical appliances such as connector elbows, and which includes an elongated rod having a slidable hammer thereon with appropriate anvil surfaces coupled to the rod and engageable by the hammer for developing impulse-type forces.

2. Description of the Prior Art

Pad-mounted transformers and other URD electrical equipment are conventionally provided with terminator appliances connecting the equipment with underground transmission and distribution lines. These terminators normally include a central conductor and are configured for reception within complemental bushings or the like provided on the transformer or other equipment. For example, many pad-mounted transformers in use today include annular cup-like bushings on the forward tank wall thereof which are adapted to receive L-shaped terminator elbows in order to connect the transformer into the URD system. During installation, these elbows are normally coated with silicone grease or other type of lubricant and are installed over the complemental transformer bushings. Over time however, the silicone grease inevitably tends to harden with the result that a firm bond is established between the elbow and bushing. This problem is aggravated since in many instances terminator elbows will be removed only at very infrequent intervals (e.g., five years or more), and thus it is a quite common occurrence to find that the elbows are rigidly stuck in place and impossible to remove by hand even if this were an accepted practice.

It has been suggested in the past to provide elongated, insulative elbow pulling poles which are intended primarily to permit removal of terminator elbows without the necessity of grasping the same by hand or with conductive metallic tools. In general, these pulling poles comprise only an elongated hot line tool having a detachable elbow-gripping fixture secured to the forward end thereof. In use, the hot line tool is manipulated to close the elbow grippers around the stuck elbow, whereupon the lineman attempts to jerk the elbow free. This practice is of course undesirable since the lineman must in many instances exert considerable force on the elbow in order to free the same.

Furthermore, prior elbow pulling tools of this type have proven to be somewhat deficient in that flashover to ground can occur between the energized contact of the elbow and adjacent grounded surfaces during elbow removal. This problem can result when the lineman does not pull the terminator cleanly from the corresponding bushing so that the elbow contact and a grounded surface are in relatively close proximity for a period of time sufficient to permit sustained arcing. This arc may flash to the nearest grounded point such as the transformer tank wall if the transformer is of the dead-front type.

A greatly improved elbow puller is disclosed in U.S. Pat. No. 3,962,770. In this device, an elongated pushrod is pivotally linked to an insulative elbow-gripping pole; the pivotal linkage permits relative axial movement between the pushrod and pole so that appropriate manipulation of the tool simultaneously creates a pushing force through the pushrod and a corresponding, multiplied, oppositely directed pulling force on the elbow-gripping pole in order to quickly and smoothly detach the elbow. Elbow pullers of the type described in this patent have proven to be very serviceable, and a decided improvement in the art. Nevertheless, these pushrod-type pullers do not provide any real degree of assistance during elbow installation, which should likewise be accomplished on a relatively quick, smooth basis.

Other prior art patents describing various types of manipulative tools include: U.S. Pat. Nos. 634,276, 981,857, 1,938,419, 2,646,304, 2,934,984, 3,030,837, 3,175,705, 3,444,578, 3,534,993, and 4,034,594.

SUMMARY OF THE INVENTION

The present invention broadly includes an elongated rod having workpiece-engaging means adjacent one end thereof, along with tubular hammer means telescoped over the rod and reciprocally slidable along a portion of the length thereof. The hammer means includes structure defining a pair of hammering surfaces respectively adjacent the opposed ends thereof, and corresponding anvil-defining structure is secured to the rod to present a pair of anvil surfaces oriented for engagement by corresponding hammering surfaces when the hammer means is slid along the rod. Thus, when the hammer means is slid along the rod in a first direction, it engages one of the anvil surfaces and imparts an impulse-type force along the rod and workpiece-engaging means; on the other hand, when the hammer is slid along the rod in a second direction opposite the first direction, the remaining hammering surface engages the corresponding anvil surface, thereby creating an oppositely directed impulse force.

In particularly preferred forms, the workpiece-engaging means is designed for releasably gripping an appliance such as an electrical connector elbow, and includes a pair of opposed, shiftable jaws.

In other preferred forms, the anvil means is positioned within the bore of the tubular hammer means so that operation of the tool can proceed without fear that the operator's fingers will be inadvertently pinched between external hammering and anvil surfaces. That is to say, in this embodiment the anvil means is secured to the rod within the bore of the tubular hammer means and presents a pair of opposed anvil surfaces. The corresponding hammering surfaces are positioned within the hammer bore oriented for engaging the respective, opposed anvil surfaces.

If the tool is to be employed for removing or installing electrical connector elbows, or in the context of other work in and around energized electrical equipment, it is preferred that at least a part of the elongated rod be formed of electrically insulative material; moreover, it is desirable to provide means for selective opening and closing of the elbow-engaging jaws from the end of the rod remote from the jaws. Such a remote operating mechanism is described in U.S. Pat. No. 3,962,770, which is hereby incorporated by reference herein.

BRIEF DESCRIPTION OF THE DRAWING

FIG. 1 is a plan view of a tool in accordance with the invention, illustrated in gripping relation about an electrical connector elbow;

FIG. 2 is a vertical sectional view taken along line 2—2 of FIG. 1 which further illustrates the preferred construction of the hammer means;

FIG. 3 is an enlarged, fragmentary vertical sectional view of the tool which depicts the internal construction of the preferred hammer means, along with the internal anvil structure;

FIG. 4 is a fragmentary view illustrating the elbow-engaging jaws of the tool in an opened condition prior to gripping a connector elbow;

FIG. 5 is a fragmentary view in partial vertical section illustrating the hammering action when the tool is employed for removing an electrical elbow;

FIG. 6 is a view similar to that of FIG. 5, but illustrates the opposite hammering operation, employed when an elbow is to be completely installed; and FIG. 7 is a fragmentary view of another embodiment of the invention, wherein a pair of spaced, external anvils are provided on the rod for engagement by corresponding, external hammering surfaces on the hammer means.

DESCRIPTION OF THE PREFERRED EMBODIMENTS

Turning now to the drawing, an appliance tool 10 in accordance with the invention is illustrated in FIG. 1 and broadly includes an elongated, insulative pole or rod 12, means broadly referred to by the numeral 14 adjacent the forward end of the rod 12 for releasably gripping an appliance such as an electrical connector elbow 16, tubular hammer means 18 telescoped over rod 12 and reciprocally slidable along a portion of the length thereof, and structure generally referred to by the numeral 20 (see FIG. 3) for defining a pair of anvil surfaces 22, 24 respectively engageable by the slidable hammer means 18 during use of tool 10. Finally, a manipulative handle 26 is secured to rod 12 adjacent the end thereof remote from the appliance-gripping means 14, for purposes which will be made clear.

In more detail, the rod 12 includes a rearward, hammer-receiving, metallic section 28 which is threaded on the opposed ends thereof. As best seen in FIG. 5, handle 26 is threaded onto the rearmost end of section 28. The overall rod 12 further includes an elongated, electrically insulative, synthetic resin forward section 30. A connecting ferrule 32 is employed to axially interconnect the sections 28, 30 (see FIG. 6). That is to say, appropriate connector nuts 34 are provided for securing the forward end of section 28 to ferrule 32, whereas conventional coupling means 36 is used to secure the rearward end of section 30 within ferrule 32. The forward end of the rod section 30 is equipped with a metallic ferrule cap 38 and an outwardly projecting, threaded shank 40 having a conical operating member 42 secured to the forwardmost end thereof. Finally, synthetic resin safety collar 44 is affixed to section 30 proximal to ferrule 32, in order to prevent the user from inadvertently sliding his hand along the length of section 30 and into dangerously close proximity to the forward work end of tool 10.

The appliance-gripping means 14 is of conventional construction, and is of the type described in U.S. Pat. No. 3,962,770. Briefly, however, the overall structure includes a pair of shiftable appliance-gripping jaws 46, 48 which are pivotally secured to a metallic base 50. The base 50 is in turn threaded onto the shank 40 so as to locate the operating member 42 adjacent the rearmost ends of the respective jaws 46, 48. A spring 52 operatively connected between the jaws 46, 48 serves to bias the latter apart. Moreover, each jaw 46, 48, is provided with a rearmost, arcuate operating surface 54, 56, which is engageable by the operating member 42 during use of tool 10 as will be described.

In the most preferred form of the invention illustrated in FIGS. 1-6, the hammer means 18 is in the form of an elongated, tubular body formed of respective, opposed, interconnected, semicircular in cross-section body halves 58, 60. These halves 58, 60 are interconnected adjacent the opposed ends thereof by means of bolts 62.

The tubular body cooperatively defined by halves 58, 60, is configured to present an enlarged central bore 64 therein and a pair of elongated, reduced diameter bores 66 at the ends of the hammer for slidably receiving the rod section 28 in a closely fitting, essentially conforming fashion. In addition, the end caps 68, 70, cooperatively defined by the body halves 58, 60, are radially enlarged relative to the remainder of the body and present, on the inner face thereof in communication with bore 64, respective annular hammering surfaces 72, 74 (see FIG. 3).

The anvil structure 20 is advantageously in the form of an annular metallic collar 76 fixedly secured to rod section 28 by means of a connector 78. As best seen in FIG. 3, the collar 76 is situated within the confines of central bore 64, with annular anvil surface 22 in facing relationship to hammering surface 72, and with annular anvil surface 24 likewise being in facing relationship to annular hammering surface 74.

In the use of tool 10 for disconnecting an elbow 16 under electrical load conditions, the operator first grasps the rod 12 adjacent the rearward end thereof, with one hand grasping the handle 26. The entire tool is then axially rotated while the jaw structures 46, 48 are held stationary (as by placing the same against the elbow 16). This causes the threaded shank 40 and operating member 42 to advance leftwardly as viewed in FIG. 4, so as to engage the operating surfaces 54, 56, and effect closure of the jaws 46, 48. As the jaws 46, 48 approach the elbow 46, mechanical interference between these components prevents further rotation of the jaws, while the operator still rotates the rod 12. At the completion of this jaw closing operation, the respective jaws 46, 48 are in full gripping engagement with elbow 16, as viewed in FIG. 1.

The next step in the removal operation involves grasping of hammer means 18 by the operator and pushing it forwardly along the length of rod 28 until the surface 24 engages hammering surface 74. The operator next sharply draws the hammer rearwardly along the length of section 28 so that the hammering surface 72 comes into sharp, hammering engagement with the corresponding anvil surface 22. This in turn creates an impulse-type hammering force in the direction of arrows 80 (see FIG. 5), with the result that a sharp dislodging or pulling force is directed against the elbow 16. This operation in turn serves to quickly and cleanly pull the elbow 16 from its associated bushing, with a minimum of arcing or flashover.

On the other hand, if it is desired to install an elbow 16, this procedure is merely reversed. That is to say, the jaws 46, 48 are first manipulated to enclose and grip the elbow 16, whereupon the elbow is placed within its associated bushing. The hammer is then first drawn rearwardly so that the hammering surface 72 comes into contact with the anvil surface 22. The operator then sharply pushes the hammer forwardly along the length of section 28 until hammering surface 74 comes into sharp, hammering engagement with the anvil surface 24. This in turn creates a forwardly directed force in the direction of arrow 82 (see FIG. 6), with the result that the elbow 16 is firmly emplaced in its associated bushing.

Referring now to FIG. 7, another embodiment of the invention is illustrated. In this case, the tool is identical with tool 10, except for the specific configuration of the hammer and anvil structure. For this reason, like parts are designated with like reference numerals. However, in this embodiment external anvil surfaces are provided which are respectively engageable by the outer surfaces of the hammer 18. Specifically, the nut 34 abutting ferrule 32 serves to present a rearwardly facing anvil surface 84. Further, a collar 86 is secured to section 28 in abutting relation to handle 26, and this collar presents a forwardly facing anvil surface 88. The use of the tool depicted in FIG. 7 is identical with that described earlier, except that, during hammering operations, the outer surfaces of the end caps 68, 70 of hammer means 18 come into hammering engagement with the corresponding anvil surfaces 84, 88. Although the hammer means 18 is depicted in FIG. 7 in the form of a two-component member connected by means of the bolts 62, those skilled in the art will appreciate that, in the case of this embodiment, the hammer means can be of integral construction and present smooth, essentially annular outermost hammering surfaces. It will also be recognized that the embodiment of FIGS. 1-6 is preferred, in that the possibility of pinching of the operator's fingers between external hammering and anvil surfaces is minimized.

We claim:

1. An appliance tool for removing and installing electrical connector elbows and the like, said tool comprising:
   an elongated rod including an elongated forward section having an electrically insulative portion adjacent the rearward end thereof, an elongated, rearward, hammer means-receiving section, and an elongated, rearmost handle, said forward section, rearward section and handle being interconnected and substantially axially aligned;
   means adjacent the forward end of said forward section of said rod for releasably gripping said elbow or the like including a pair of opposed elbow-engaging jaws, and means for opening and closing of said jaws from the end of said rod remote from said jaws and without the need for manual manipulation adjacent said jaws;
   tubular hammer means telescoped onto said hammer means-receiving section and reciprocally slidable fore and aft therealong; and
   structure defining a pair of anvil surfaces operatively secured to said rod for defining the fore and aft stroke limits and hence the stroke length of said hammer means, said stroke length being of lesser length than the length of said forward section of said rod, one of said surfaces being oriented for engagement by said hammer means when the hammer means is slid along said rod in a forward direction, the other of said surfaces being oriented for engagement by said hammer means when the hammer means is slid along said rod in a rearward direction opposite said forward direction, said anvil surfaces each serving to transmit hammering forces imparted thereto by said hammer means along the length of said rod and to said gripping means,
   said hammer means-receiving section, handle, hammer means and anvil surface-defining structure being spaced and electrically separate from said appliance-gripping means.

2. The tool as set forth in claim 1, said hammer means including a pair of internal hammering surfaces respectively adjacent the opposed ends thereof, said anvil surface-defining structure including an annular collar presenting a pair of opposed, annular, anvil surfaces and secured to said hammer-receiving section and positioned within the bore of said hammer means, said hammer means being reciprocally slidable relative to said collar, said hammering surfaces being respectively engageable with a corresponding annular anvil surface.

3. The tool as set forth in claim 1, said hammer means including a pair of external hammering surfaces adjacent the opposed ends thereof, said anvil surface-defining structure comprising a pair of spaced anvils respectively located adjacent the opposed ends of said hammer-receiving section.

* * * * *